UNITED STATES PATENT OFFICE.

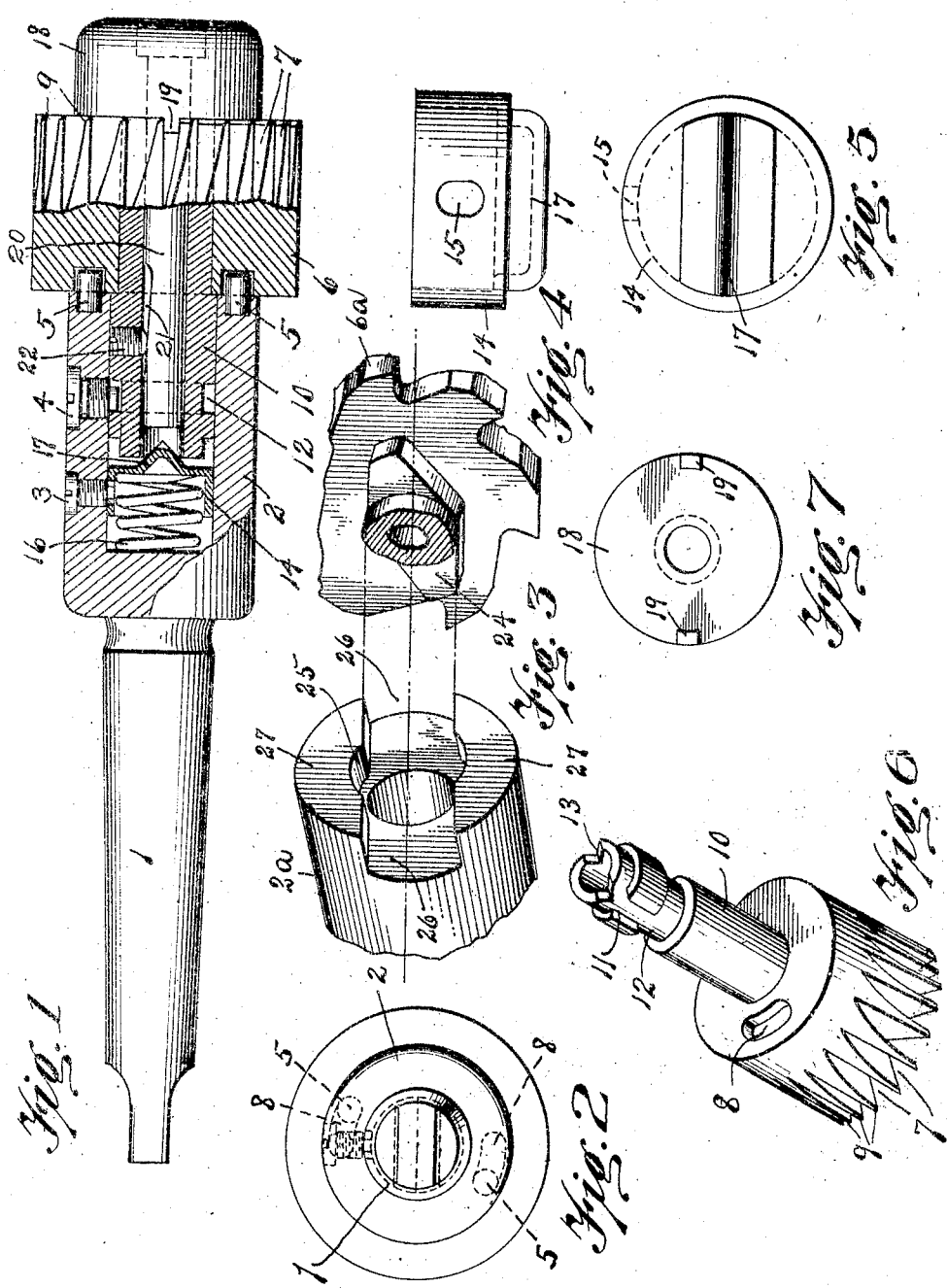

FRANK C. HOSSIE AND HENRY WILD, OF DETROIT, MICHIGAN, ASSIGNORS TO GENERAL MANUFACTURING COMPANY, OF DETROIT, MICHIGAN, A CORPORATION OF MICHIGAN.

TOOL.

1,332,898.

Specification of Letters Patent.     Patented Mar. 9, 1920.

Application filed March 31, 1919. Serial No. 286,515.

*To all whom it may concern:*

Be it known that we, FRANK C. HOSSIE, and HENRY WILD, citizens of the United States and Switzerland, respectively, and residing at Detroit, in the county of Wayne and State of Michigan, have invented a new and Improved Tool, of which the following is a specification.

This invention consists in a tool holder having a socket and one or more longitudinally extending projections at one end, and a cylindrical cutter having a shank extending up into the socket and also formed to operatively engage the projections on the tool holder.

It further consists in a pilot at the outer end of the cutter and provided with projections engaging transverse teeth formed on the adjacent end of the cutter whereby the pilot may be compelled to turn with the cutter.

It also consists in providing the shank of the cutter and the socket therefor with interengaging members formed on the well known bayonet-lock principle, in forming the shank with a transverse notch in its inner end, and in mounting a spring-actuated non-rotatable detent in the socket to enter said groove and restrain the shank from turning after it has been secured in place by means of the bayonet lock.

It also consists of the details of construction illustrated in the accompanying drawings and particularly pointed out in the claims.

In the drawings, Figure 1 is a central longitudinal section of the socket and cutter of this improved tool. Fig. 2 is an end elevation of the tool taken from the left in Fig. 1. Fig. 3 is a perspective of a preferred modification of the interengaging parts of the socket and cutter. Fig. 4 is a side elevation and Fig. 5 an end elevation of a detent on a larger scale. Fig. 6 is a perspective of a cutter and its shank. Fig. 7 is an inner end elevation of the pilot.

Similar reference letters refer to like parts throughout the several views.

The holder portion of this tool is preferably formed with a standard shank 1 and with a socket 2 through whose wall extend the screws 3 and 4 and from whose outer end may extend the projections 5, preferably pins of hard tough steel, although they may be formed integral with the socket.

The cutter 6 is preferably of the usual cylindrical form and may have elongated notches 8 in its inner end and whose teeth 9 are separated by indentations 7 which extend across the outer or cutting end.

A shank 10 may be integral with the cutter or rigidly secured thereto, and this shank is preferably formed with a longitudinal groove 11 (Fig. 6) connecting with a circumferential groove 12 which receives the reduced inner end of the screw 4. The shank may also be formed with a transverse notch 13, and a detent 14 may be slidably mounted in the socket 2. The cylindrical body of this detent is shown with an elongated hole 15 to receive the inner end of the screw 3, the hole permitting longitudinal movement of the detent under pressure of the spring 16 or of the shank 10. The transverse tooth 17 of the detent preferably fits the notch 13.

In order to center the cutter with a pilot hole in the work, the pilot 18 may be employed and this is preferably formed with projections 19 to engage teeth 9 of the cutter so that the pilot will always turn with the cutter. The pilot may be held in position by a pin 20 which may have a flat inclined surface 21 which may be engaged by the screw 22 carried by the shank 10.

When the cutter is to be mounted on the holder, the shank 10 is inserted in the socket and turned until the end of the screw 4 enters the end of the longitudinal groove 11, whereupon the shank may be moved inwardly until the screw 4 reaches the circumferential groove 12, at which time the end of the shank has pressed the detent back and compressed the spring 16. The cutter and shank are now turned until the tooth 17 enters the notch 13, as shown in Fig. 1, at which position the detent will restrain the shank from turning back in the socket and again bring the screw 4 and groove 11 into alinement. The detent tooth 17, the notches 8 in the cutter, the screw 4, and the grooves 11 and 12 in the shank are so positioned that the pins 5 on the socket will be at the left ends of the notches 8 when the screw 4 is in alinement with the groove 11, and the pins 5 will be in right or driving ends of the notches 8 when the tooth 17 is in the transverse notch 13 in the end of the shank.

To remove the cutter from the holder it is merely necessary to turn the cutter ahead a few degrees against the force of the detent to bring the screw 4 and the groove 9 into alinement whereupon the shank 8 will slide out of the socket freely.

A preferred form of interengaging mechanism between the socket and cutter is shown in Fig. 3 where the cutter 6ª has an integral transverse bit 24 formed with tapering ends, at the base of the shank 10, and the socket 2ª has a counterbore 25 and transverse notches or grooves 26 of such width that diagonally opposite sides of the bit 24 may simultaneously engage diagonally opposite sides of the projections 27. This permits the shank 10 to be turned in the bore of the socket so as to aline the tooth 17 with the transverse notch 13 after the shank has been inserted fully. Both the bit and grooves therefor can be easily machined even if the cutter is of high speed steel.

The details and proportions of the various parts may all be changed by those skilled in the art without departing from the spirit of our invention as set forth in the following claims.

We claim:—

1. In a tool, the combination of a socket having projections at its open end, a shank extending into the socket and means to hold it in position, and a substantially cylindrical cutter connected to the shank and having portions to engage the projections on the socket.

2. In a tool, the combination of a holder having a central longitudinal bore, a shank fitting said bore, means to hold the shank in the bore, and a cutter connected to the shank, said cutter and holder having interengaging portions.

3. In a tool, the combination of a holder having a central longitudinal bore and a projection at the open end of the bore, a shank fitting said bore and having a circumferential groove and a longitudinal groove, the latter extending to the circumferential groove, an engaging member projecting into said bore and adapted to travel along the longitudinal and circumferential grooves, a movable detent mounted in the bore of said holder and adapted to engage the shank to restrain it from turning, and a cutter connected to the outer end of the shank.

4. In a tool, the combination of a hollow holder and a shank fitting therein and kept from falling out by a bayonet lock, a cutter at the outer end of the shank, said cutter being driven by means of interengaging projections on the holder and cutter, and a pilot at the outer end of the cutter, said pilot being driven by a projection on the pilot engaging a tooth on the cutter.

5. In a tool, the combination of a hollow holder and a shank fitting therein, means to prevent the shank from sliding out of the holder comprising a circumferential groove in the shank and a projection on the interior of the socket, said shank also having a transverse groove across its inner end and a longitudinal groove for the projection to reach the circumferential groove, and means to restrain the shank from turning comprising a non-rotatable detent adapted to engage in said transverse groove in the end of the shank.

6. In a tool, the combination of a holder and a cutter, one of said members having a central bore and the other an extension fitting the bore, means to secure the members from longitudinal movement but permitting rotation relative to each other, and means comprising projections on one of said members and notches in the other member whereby the holder may rotate the cutter.

7. In a tool, the combination of a holder and a cutter, one of said members having a central bore and the other an extension fitting the bore, means to secure the members from longitudinal movement but permitting rotation relative to each other, and means comprising a transverse projection on the cutter and notches in the holder whereby the holder may rotate the cutter.

8. In a tool, the combination of a holder and a cutter, one of said members having a central bore and the other an extension fitting the bore, one of said members formed with a notch, a movable spring held detent mounted on the other member and adapted to enter said notch, means to secure the members from longitudinal movement but permitting rotation relative to each other, and means independent of the detent whereby the holder may rotate the cutter.

9. In a tool, the combination of a holder and a cutter, one of said members having a central bore and the other an extension fitting the bore, the end of the holder engaging a shoulder of the cutter, one of said members having a notch, a spring held detent mounted on the other member and adapted to engage the notch, and projections extending parallel to said bore across between the end of the holder and the cutter whereby the holder may rotate the cutter.

FRANK C. HOSSIE.
HENRY WILD.